United States Patent
Hayashi et al.

(10) Patent No.: US 7,280,192 B2
(45) Date of Patent: Oct. 9, 2007

(54) LENS METER

(75) Inventors: Akihiro Hayashi, Toyokawa (JP);
Tadashi Kajino, Okazaki (JP); Kan Ohtsuki, Toyokawa (JP)

(73) Assignee: Nidek Corporation, Nagoya (JP)

(*) Notice: Subject to any disclaimer, the term of this patent is extended or adjusted under 35 U.S.C. 154(b) by 328 days.

(21) Appl. No.: 11/113,070

(22) Filed: Apr. 25, 2005

(65) Prior Publication Data

US 2005/0237513 A1  Oct. 27, 2005

(30) Foreign Application Priority Data

Apr. 23, 2004  (JP) .............................. 2004-128521

(51) Int. Cl.
*G01B 9/00* (2006.01)

(52) U.S. Cl. ...................... 356/124; 356/128

(58) Field of Classification Search ......... 356/124–128
See application file for complete search history.

(56) References Cited

U.S. PATENT DOCUMENTS

| | | |
|---|---|---|
| 3,880,636 A | 4/1975 | Tobin et al. |
| 5,489,978 A | 2/1996 | Okumura et al. |
| 5,734,465 A | 3/1998 | Kajino |
| 5,855,074 A | 1/1999 | Abitbol et al. |
| 5,910,836 A | 6/1999 | Ikezawa et al. |
| 6,061,123 A | 5/2000 | Ikezawa et al. |
| 6,972,837 B2 * | 12/2005 | Kajino ........................ 356/124 |
| 2003/0043367 A1 | 3/2003 | Kajino |

FOREIGN PATENT DOCUMENTS

| | | |
|---|---|---|
| EP | 0 756 166 A2 | 1/1997 |
| JP | A 50-145249 | 11/1975 |
| JP | A 09-043103 | 2/1997 |
| JP | A 10-104118 | 4/1998 |
| JP | A 10-104120 | 4/1998 |
| JP | A 2003-075296 | 3/2003 |

* cited by examiner

Primary Examiner—Gregory J. Toatley, Jr.
Assistant Examiner—Tri Ton
(74) Attorney, Agent, or Firm—Oliff & Berridge, PLC (57) ABSTRACT

A lens meter for measuring refractive power distribution of a progressive power lens and displaying its distribution map, has a lens rest having an aperture, an optical system including an axis, a source projecting a light bundle along the axis, a plate having targets and a two-dimensional image sensor detecting images by the bundle passing through the lens, aperture and plate, a part calculating the distribution within a measurement region from detection results, a part detecting a lens-position in a two-dimensional direction orthogonal to the axis, a device guiding movement on the rest to shift the measurement region and obtaining the distribution within an analysis region including distance, progressive and near portions, a part storing the distribution in the measurement region in association with the detected position, a display part, and a part controlling to display the distribution map within the analysis region based on the stored distribution and position.

5 Claims, 6 Drawing Sheets

```
S   -1.00D
C   -1.50D
A    80
ADD +2.25D
```

LENS METER

BACKGROUND OF THE INVENTION

1. Field of the Invention

The present invention relates to a lens meter for measuring optical characteristics of a lens.

2. Description of Related Art

Conventionally, there is known a lens meter which projects a measurement light bundle onto a subject lens to be measured which is placed on a measurement optical axis, and photo-receives the measurement light bundle having passed through the subject lens by the use of a photo-sensor, and then obtains optical characteristics such as refractive power of the subject lens based on the photo-receiving results. For this kind of lens meter, proposed initially was one which measures optical characteristics in one measurement position (measurement point) of the subject lens, and after that, proposed recently has been one which measures optical characteristics in a plurality of measurement positions (measurement points) at a time within a measurement region covering a wide range extending over a distance portion, a progressive portion and a near portion of the subject lens (see U.S. Pat. No. 5,910,836 corresponding to Japanese Patent Application Unexamined Publication No. Hei10-104120, and other references).

Though the lens meter which measures the optical characteristics in one measurement position is enough for measurement of a single vision lens, it takes a lot of trouble in measurement of a progressive power lens before finding the distance portion and the near portion. Further, it takes much time to obtain refractive power distribution of the progressive power lens.

On the other hand, the lens meter which measures the optical characteristics in the plurality of measurement positions can easily obtain the refractive power distribution of the progressive power lens; however, requirements are extensively increased in order to meet necessity and size of optical members such as a screen and an image forming lens, size of a photo-receiving surface of the photo-sensor, performance of a calculation part, and the like for obtaining refractive powers in the respective measurement positions within the measurement region covering the wide range extending over the distance portion, the progressive portion and the near portion, and thereby the cost of production is raised. Further, since the measurement cannot be performed while bringing heights to a rear surface of the lens within the measurement region to be almost constant, measurement results on the distance portion and the near portion positioned in a peripheral part within the measurement region possesses low reliability.

SUMMARY OF THE INVENTION

An object of the invention is to overcome the problems described above and to provide a lens meter which makes it possible to measure refractive power distribution of a progressive power lens and display a map of the refractive power distribution with a low-cost structure.

To achieve the objects and in accordance with the purpose of the present invention, a lens meter has a lens rest having an aperture of predetermined diameter, which supports the subject lens, a measurement optical system including a measurement optical axis passing through the aperture, a light source projecting a measurement light bundle along the measurement optical axis, a target plate having a plurality of measurement targets, and a two-dimensional image sensor detecting images of the targets, the target images being formed by the measurement light bundle having passed through the subject lens, the aperture and the target plate, a calculation part which obtains refractive power distribution within a measurement region of the subject lens based on a detection result obtained by the image sensor, the measurement light bundle having passed through the measurement region being capable of passing through the aperture, a detection part which detects a position of the subject lens in a two-dimensional direction orthogonal to the measurement optical axis, a guiding device which guides movement of the subject lens on the lens rest so as to shift the measurement region so that refractive power distribution within an analysis region of the subject lens including a distance portion, a progressive portion, and a near portion is obtained, a storage part which stores the refractive power distribution within the measurement region obtained in accordance with the shift of the measurement region by the movement of the subject lens while associating with the position detected at the time of the obtainment, a display part, and a display control part which controls to display a map of the refractive power distribution within the analysis region on the display part based on the stored refractive power distribution within the measurement region and the stored position.

Additional objects and advantages of the invention are set forth in the description which follows, are obvious from the description, or may be learned by practicing the invention. The objects and advantages of the invention may be realized and attained by the lens meter in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
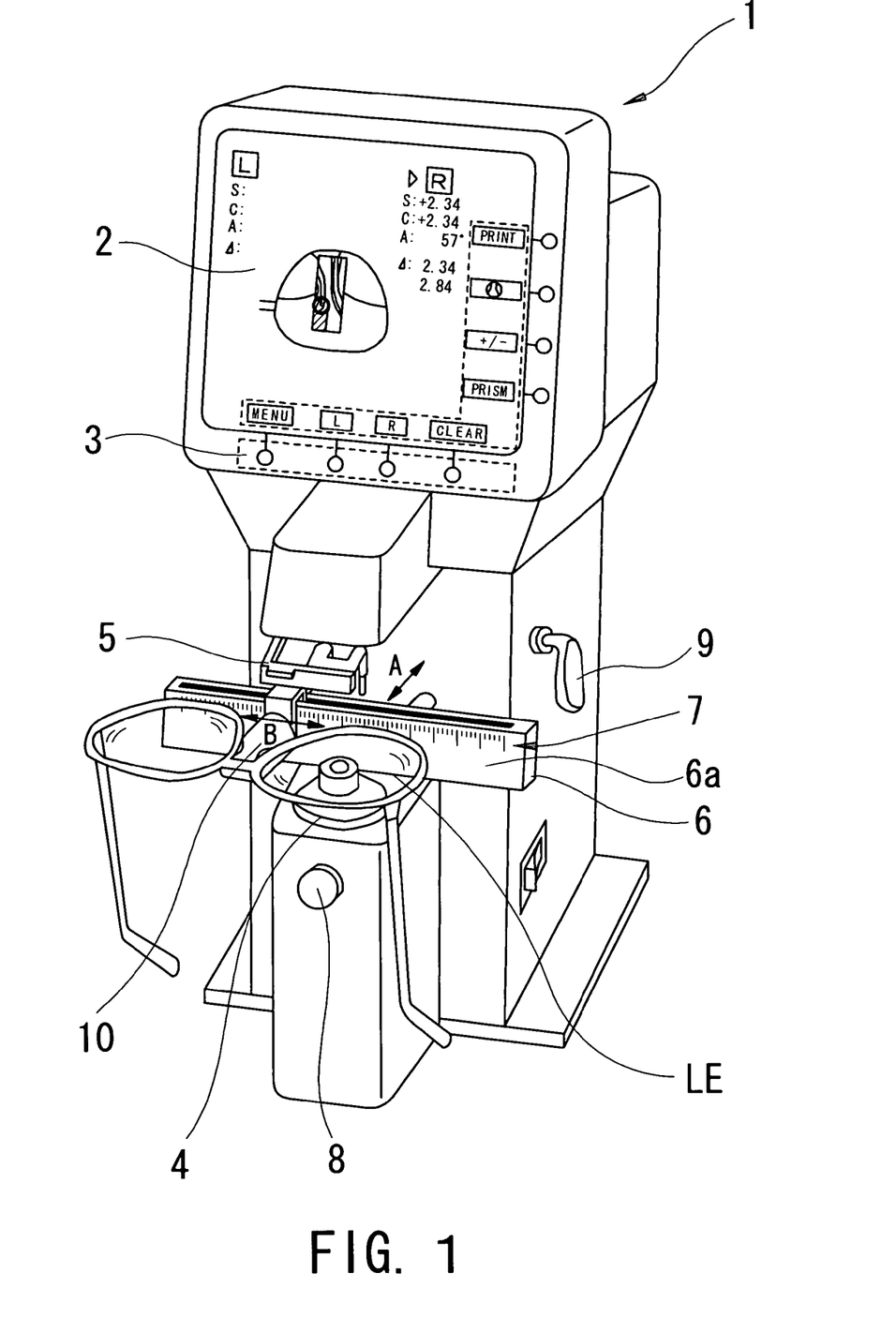
FIG. 1 is a schematic external view of a lens meter consistent with the preferred embodiment of the present invention.

A detailed description of one preferred embodiment of a lens meter embodied by the present invention is provided below with reference to the accompanying drawings. FIG. 1 is a schematic external view of the lens meter consistent with the preferred embodiment of the present invention.

On a display 2 such as a liquid crystal display arranged at the top of a body 1 of the lens meter, information necessary for measurement, measurement results, and the like are displayed. At the press of one of switches 3 corresponding to switch displays on the display 2, necessary instructions such as measurement mode switching are inputted.

A subject lens LE to be measured is mounted on a nosepiece (lens rest) 4, and a lens holder 5 is moved downward (to a nosepiece 4 side) to stably hold the lens LE mounted on the nosepiece 4.

When measuring the lens LE in frames, a frame table (lens table) 6 movable in a back/forth direction (the arrow A direction in FIG. 1) is brought into contact with the lower ends of right/left lens frames (i.e., the lower ends at the time of wearing spectacles) (or right/left lenses) for stabilization, so that a cylindrical axial angle of the lens LE can be accurately measured. The frame table 6 is moved in the back/forth direction through the operation of a lever 9. Additionally, a detector 31 (see FIG. 2) such as a potentiometer is provided in the body 1 to detect a movement amount (movement position) of the frame table 6 in the back/forth direction, i.e., a movement amount (movement position) of the lens LE on the nosepiece 4 in the back/forth direction.

Further, when measuring the lens LE in frames, a nose pad of the frames is brought into contact with a pad rest 10. The pad rest 10 is hold to be movable on the frame table 6 in a right/left direction (the arrow B direction in FIG. 1). In addition, a detector 32 (see FIG. 2) such as an encoder is provided within the frame table 6 to detect a movement amount (movement position) of the pad rest 10 in the right/left direction, i.e., a movement amount (movement position) of the lens LE on the nosepiece 4 in the right/left direction. Further, the pad rest 10 is hold to be movable also in a height direction by means of a spring and the like, and a position of the lens LE in an optical axis direction thereof is adjusted in a state where the nose pad of the frames is in contact with the pad rest 10.

When measuring respectively the right/left lenses LE in frames, centering is performed on the respective lenses, so that a movement distance (movement amount) of the pad rest 10 in the right/left direction, i.e., a center distance between the right/left lenses LE is measured. In addition, the frame table 6 is provided with a distance scale 7; therefore, the center distance may be read with the scale 7.

A READ switch 8 is for transmitting an instruction signal for storing measurement results on the lens LE. At the press of the switch 8, the measurement results are displayed on the display 2 and concurrently stored into a memory inside the body 1.

Figure 2:
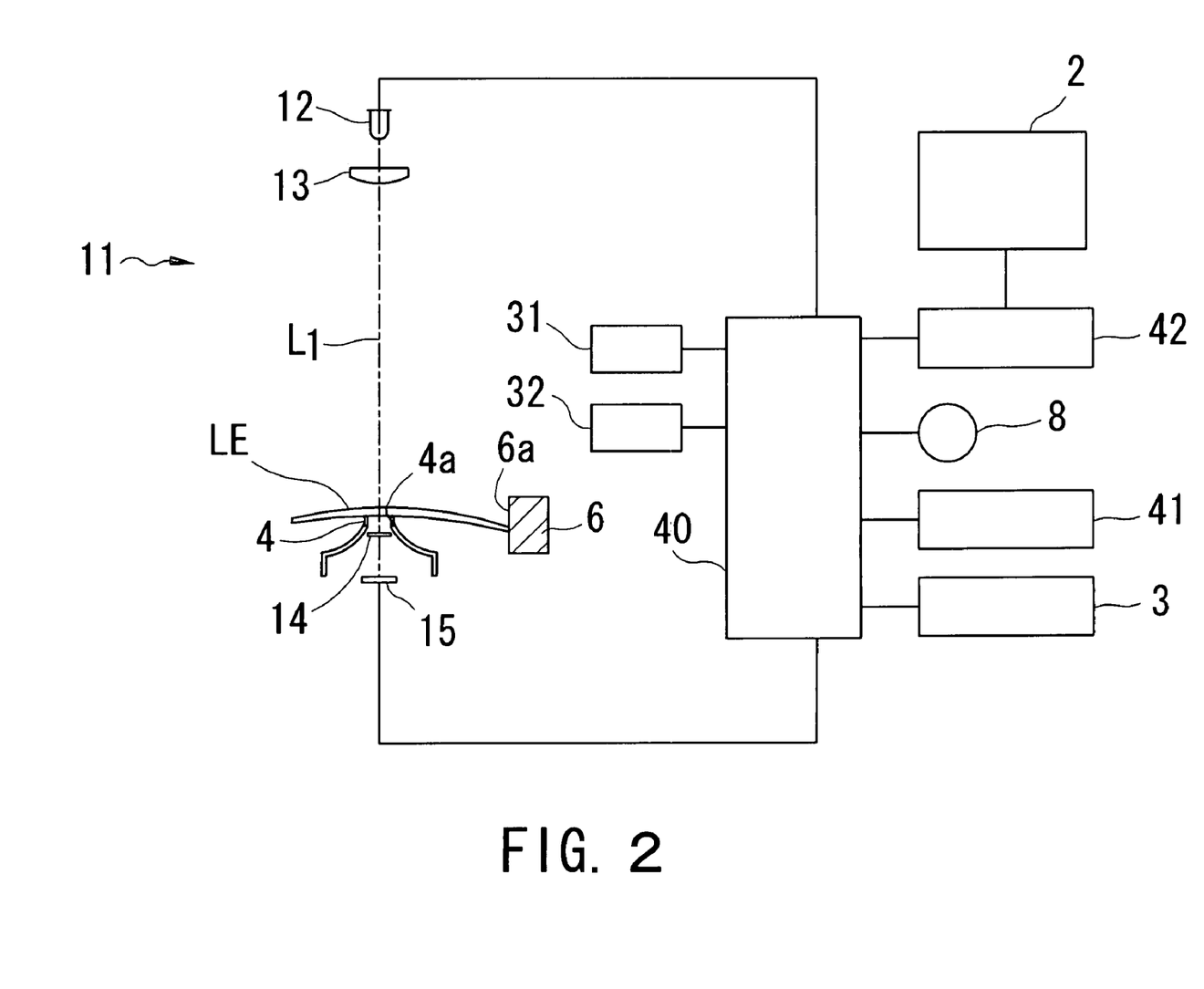
FIG. 2 is a view showing a schematic configuration of an optical system and a control system of the lens meter.

FIG. 2 is a view showing a schematic configuration of an optical system and a control system of the apparatus (lens meter) consistent with the present embodiment. Reference numeral 11 denotes a measurement optical system and L1 denotes a measurement optical axis thereof. The measurement optical system 11 is provided with a light source 12 for measurement such as an LED, a collimating lens 13, a target plate 14 on which measurement targets are formed, and a two-dimensional photo-sensor (image sensor) 15, which are arranged on the optical axis L1. The optical axis L1 passes through the center of an aperture 4a of the nosepiece 4 and is orthogonal to an aperture plane of the aperture 4a. The target plate 14 is arranged immediately below the aperture 4a. The aperture 4a is in a circular shape of approximately 8 mm in diameter.

Figure 3:
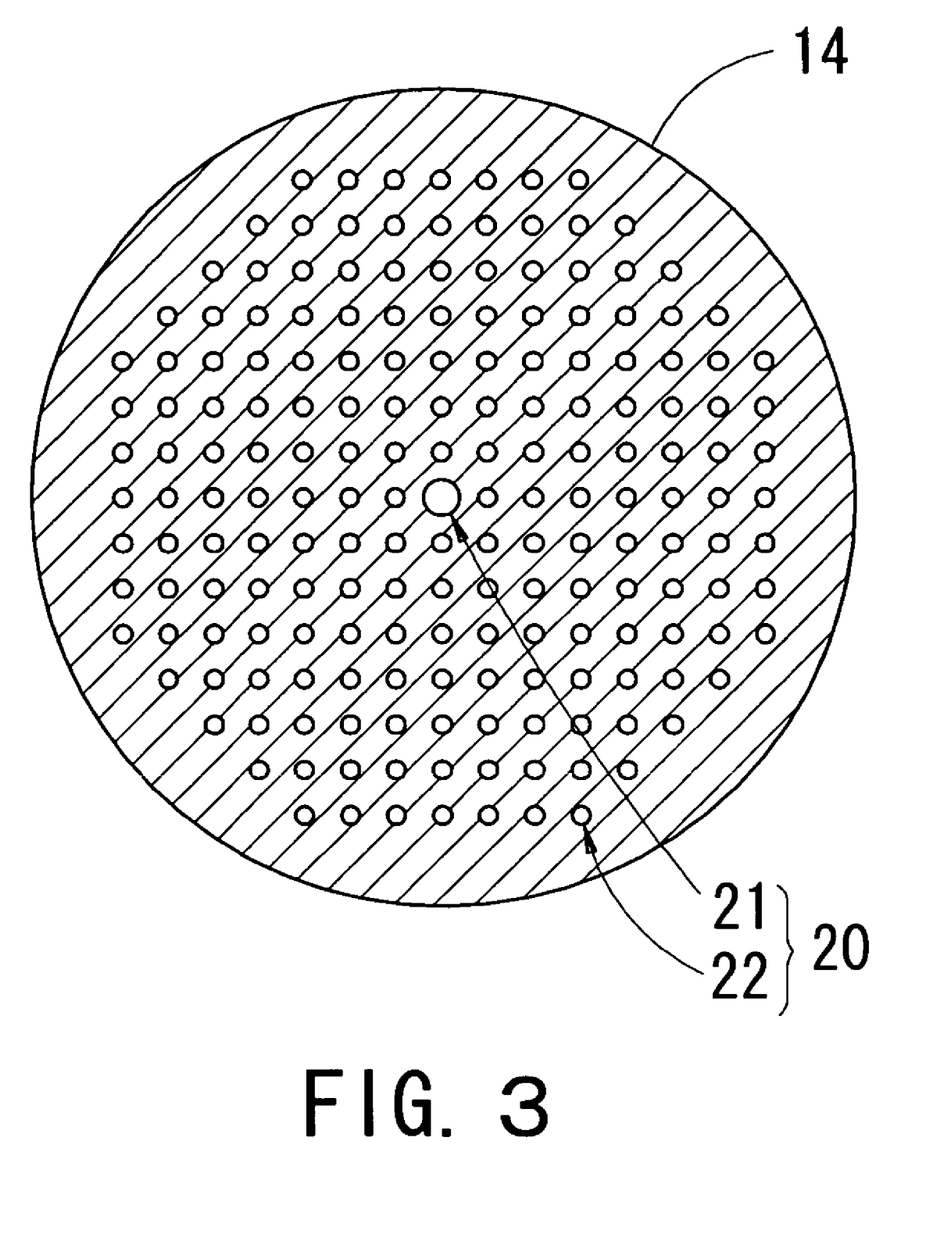
FIG. 3 is a view illustrating a pattern of arrangement (distribution) of measurement targets formed on a target plate.

FIG. 3 is a view illustrating a pattern of arrangement (distribution) of the measurement targets formed on the target plate 14. On the target plate 14, a number of measurement targets 20 are formed. The targets 20 consistent with the present embodiment are constituted of a large circular pinhole (aperture) of approximately 0.4 mm in diameter being a central target 21 which is arranged in a center position through which the optical axis L1 passes, and small circular pinholes (apertures) of approximately 0.2 mm in diameter being peripheral targets 22 with approximately 0.5 mm pitches on a grid which are arranged around the central target 21. The targets 22 which are about 200 in number are arranged in a range of approximately 7 mm in diameter having the optical axis L1 as the center. Besides, the targets 20 may be formed by applying black Cr coating, where voids are formed as the target 21 and the targets 22, to a rear surface of the target plate 14.

A measurement light bundle from the light source 12 is made into a parallel light bundle by the collimating lens 13 and projected onto the lens LE mounted on the nosepiece 4 and placed on the optical axis L1. In the measurement light bundle transmitted through the lens LE, a measurement light bundle passing through the aperture 4a and subsequently through the target (pinhole) 21 and the targets (pinholes) 22 on the target plate 14 enters the photo-sensor 15.

Incidentally, a distance from the aperture 4a to the target plate 14 and a distance from the target plate 14 to the photo-sensor 15 are designed so that an image of the target 21 is detected by the photo-sensor 15 at all times even when a lens with negative spherical power assumed to be measurable (e.g., a lens with spherical power of −25 D) or a prism (e.g., a prism with prism power of 10Δ) is mounted on the nosepiece 4 and placed on the optical axis L1. The image of the target 21 is utilized as an image of a reference target for specifying a correspondence among images of the targets 22, i.e., as an image of a reference target for specifying the images of the targets 22 in a measurement state where the lens LE is placed on the optical axis L1 with respect to the images of the targets 22 in a reference state where the lens LE is not placed on the optical axis L1 (i.e., a "OD (diopter) reference"). Besides, as long as the reference target is distinguishable from the other measurement targets, it may be arranged in a position other than the central position of the target plate 14, and the number and shape thereof are not limited.

An output signal from the photo-sensor 15 is inputted to a calculation and control part 40. The calculation and control part 40 is connected with a memory 41. The calculation and control part 40 obtains optical characteristics (spherical power, cylindrical power, a cylindrical axial angle, prism power) of the lens LE from a change in positions (coordinates) of the respective target images detected by the photo-sensor 15 in the measurement state where the lens LE having refractive power is mounted on the nosepiece 4 and placed on the optical axis L1, with respect to positions (coordinates) of the respective target images detected by the photo-sensor 15 in the reference state where the lens LE is not mounted on the nosepiece 4 and not placed on the optical L1. For example, in a state where the lens LE having only the spherical power is placed on the optical axis L1, relative to the state where the lens LE is not placed thereon, the positions of the respective target images are changed to bring about magnification or demagnification in a perfect-circular shape with respect to an optical center of the lens LE. The spherical power is obtained based on a magnification amount or a demagnification amount at this time. Further, in a state where the lens LE having only the cylindrical power is placed on the optical axis L1, relative to the state where the lens LE is not placed thereon, the positions of the respective target images are changed to bring about magnification or demagnification in an oval shape with respect to an axial center of the lens LE. The cylindrical power and the cylindrical axial angle are obtained based on a magnification amount or a demagnification amount at this time. Further, the prism power is obtained based on a translation amount of the position of the image of the target 21 or the positions of the images of the targets 22 in the vicinity (periphery) thereof. The lens LE having the spherical power, the cylindrical power and the prism power may be regarded as the complex of the above lenses (see U.S. Pat. No. 3,880,525 corresponding to Japanese Patent Application Unexamined Publication No. Sho50-145249).

Incidentally, the calculation and control part 40 can obtain the optical characteristics (refractive powers) of the lens LE from an average of the change in the positions of the respective target images in each group while making four (at least three) adjacent target images (of 2×2 spots) one group, or adjacent target images of 3×3 spots, 4×4 spots, 5×5 spots, or the like one group. A measurement position (measurement point) at this time is set in a position on the lens LE corresponding to a central position or a position of a specific target image of each group of the target images. Therefore, owing to a constitution of the apparatus consistent with the present embodiment, the optical characteristics in a plurality of measurement positions (measurement points) within a measurement region of the lens LE corresponding to the aperture 4a may be obtained at a time. In other words, distribution of the optical characteristics within the measurement region may be obtained. Thus, in a progressive power lens, it is possible efficiently to judge whether or not at least one of the current measurement positions is in a distance portion (i.e., whether or not a part of the distance portion is within the current measurement region). Similarly, it is possible efficiently to judge whether or not at least one of the current measurement positions is in a near portion (i.e., whether or not a part of the near portion is within the current measurement region).

Besides, the measurement optical system is not limited to the constitution as shown in FIG. 2. For example, the target plate 14 may be arranged on a light source 12 side of the lens LE mounted on the nosepiece 4. When measuring the optical characteristic distribution, it is preferable that the measurement positions are in at least the up/down and right/left directions having the optical axis L1 as the center. It is essential only that the arrangement (distribution) of the targets 20 satisfies the condition. In a case where the nosepiece 4 is not used, the measurement region where measurement can be performed on the plurality of measurement positions at one time may be larger than the aperture 4a.

In FIG. 2, the calculation and control part 40 is connected with a display circuit 42 for displaying instruction marks for guiding movement of the lens LE on the nosepiece 4, the measurement results such as the optical characteristic distribution, and the like on the display 2, the switch 3, the switch 8, the detectors 31 and 32, and the like. The calculation and control part 40 controls to detect a position of the lens LE in the right/left and back/forth directions orthogonal to the optical axis L1, based on output signals from the detectors 31 and 32. Then, when the lens LE is moved, the calculation and control part 40 controls to store the obtained optical characteristic distribution of the lens LE within the measurement region, with respect to each detected movement position. As mentioned above, the optical characteristic distribution within the measurement region corresponding to the aperture 4a is obtained. Accordingly, when the measurement region is shifted by the movement of the lens LE, the optical characteristic distribution in each shift position is obtained. Thus, by moving the lens LE on the nosepiece 4 so that the distance portion, a progressive portion and the near portion of the lens LE pass over the aperture 4a, the optical characteristic distribution within a region covering a comparatively wide range including those portions (hereinafter referred to as an analysis region) can be obtained with simple operation in a short time.

In the lens meter provided with the aforementioned constitution, measurement of the progressive power lens in frames will be described. Besides, the optical characteristics are obtained from the change in the positions of the respective target images in the group of the target images of 3×3 spots, and the measurement position is set in the position on the lens LE corresponding to the center position of the target images.

First, designation is made by the switch 3 as to which to be measured, the lens LE for right eye or the lens LE for left eye. Alternatively, the movement position of the pad rest 10 is detected by the detector 32 when the nose pad of the frames is moved from side to side while mounted on the pad rest 10, so that it can be detected that the lens LE on the nosepiece 4 is either for right eye or for left eye. Thus, the output signal from the detector 32 can also be used as a right/left designation signal. Hereinafter, described will be a case where the lens LE for right eye is measured.

Figure 4A:
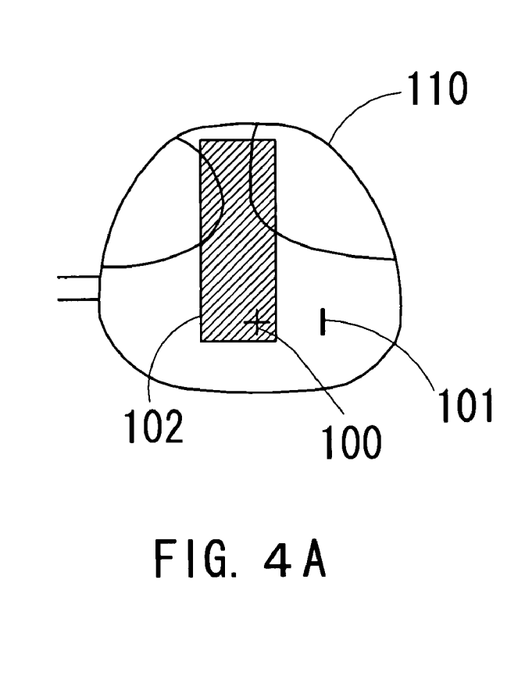
FIGS. 4A to 4C show a display example for guiding movement of a subject lens (shift of a measurement region)

After the apparatus (lens meter) is placed in a measurement mode for the progressive power lens at the press of the switch 3, a progressive power lens mark 110 imitating the progressive power lens for right eye is displayed on the display 2, and a cross mark 100 indicating a measurement starting position (point), a line target mark 101, and a rectangular mark 102 indicating the analysis region appear therein (see FIG. 4A). The size of the analysis region is set to be a possible size to include the distance portion, the progressive portion and the near portion of the progressive power lens, and in this embodiment, it is set to be approximately 40 mm long and approximately 13 mm wide. Additionally, before starting the measurement, the mark 102 is displayed as if an inside area thereof is entirely masked (see hatching parts in FIGS. 4A to 4C and FIGS. 5A to 5C).

In order that an approximate distance portion of the lens LE may become the measurement starting position (i.e. the measurement starting position may come to the approximate distance portion), the lens LE is moved while observing the display 2 so that the mark 101 coincides with the mark 100 in the approximate distance portion of the mark 110 (the mark 102). At this time, as shown in FIG. 1, the lower ends of the right/left lens frames (or right/left lenses) are brought into contact with a contact surface 6a of the frame table 6 (the right/left and the upper/lower, and the lateral and vertical of the frames or the lenses LE refer to the right/left and the upper/lower, and the lateral and vertical in a state of wearing spectacles).

In the progressive power lens, in a case where it has no cylindrical power, the distance portion is found as a region where spherical equivalent powers are approximately the same in at least three measurement positions (a predetermined allowable range exists) in the up/down direction on a meridian on which lateral prism power becomes approximately 0 (a predetermined allowable range exists). Therefore, the lateral prism power of the lens LE is obtained from the image of the target 21 or the images of the plurality of targets 22 in the vicinity (periphery) thereof, and the spherical equivalent powers are respectively obtained for the group of the target images having the target 21 as the center and respective groups of the target images positioned in an upper side and a lower side thereof by one target. If the lateral prism power is approximately 0, it is judged that the current measurement position in the right/left direction is in the distance portion (i.e., a part of the distance portion is within the current measurement region), and the mark 101 is displayed coinciding with the vertical line of the mark 100. In addition, if the spherical equivalent powers in the respective measurement positions in the up/down direction are approximately the same, it is judged that at least one of the current measurement positions in the up/down direction is in the distance portion (i.e., a part of the distance portion is within the current measurement region). When it is judged that the current measurement positions in the up/down direction are in the progressive portion (i.e., a part of the progressive portion is within the current measurement region), as an instruction to move the lens LE upward (to push the lens LE toward the back of the apparatus (lensmeter)), an arrow mark 106 (see FIG. 4B) is displayed. When at least one of the current measurement positions in the right/left and up/down directions is in the distance portion, the target mark 101 is changed into a large cross mark 105 (see FIG. 4C) to inform that alignment with the measurement starting position is completed.

In a case where the lens LE has the cylindrical power, the lateral prism power in the distance portion does not become approximately 0; therefore, the cylindrical powers are respectively obtained for the group of the target images having the image of the target 21 as the center and the respective groups of the target images positioned in a right side and a left side thereof by one target, and when the cylindrical power obtained for the group of the target images having the image of the target 21 as the center becomes the smallest, it is judged that at least one of the current measurement positions in the right/left direction is in the distance portion (i.e., a part of the distance portion is within the current measurement region), and the mark 101 is displayed coinciding with the vertical line of the mark 100.

Figure 4B:
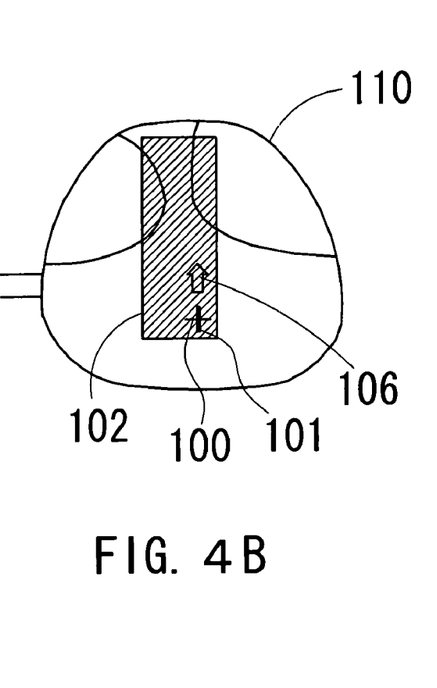
Figure 4C:
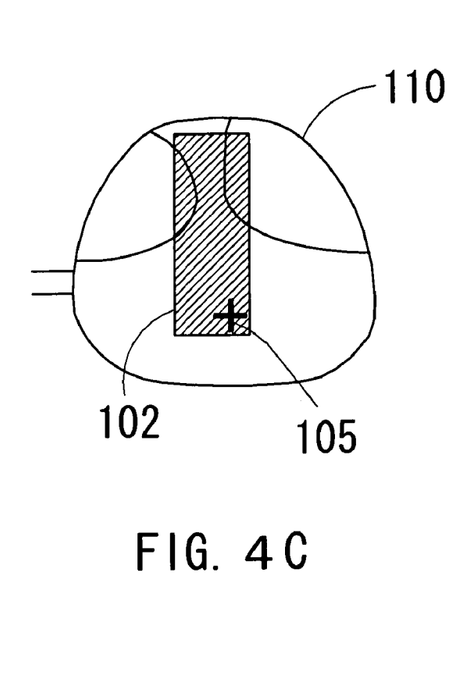
Figure 5A:
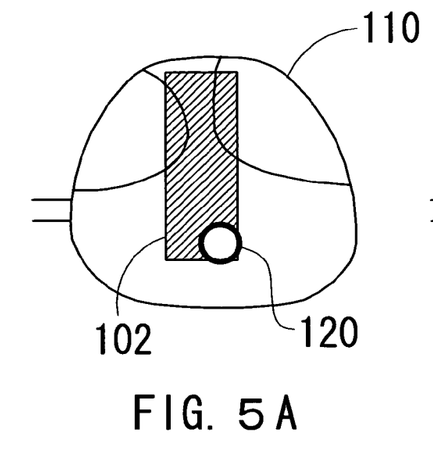
FIGS. 5A to 5D show a display example for guiding the movement of the subject lens (shift of the measurement region)

Upon completion of the alignment with the measurement starting position, the measurement is shifted to a step of measuring the refractive power distribution (spherical power distribution and cylindrical power distribution) within the analysis region. At the press of the button 8 (alternatively, when it is judged that the alignment with the measurement starting position is completed), the mark 105 is changed into a circle target mark 120 indicating the measurement region as shown in FIG. 5A. The size of the mark 120 and the size of the mark 102 are based on a correlation between the actual respective regions. Further, in the progressive power lens, the near portion is usually displaced to the nose side by approximately 2 mm relative to the distance portion; therefore, in a case where the lens for right eye is designated, the measurement starting position is made at the lower right end of the mark 102, and the region of the mark 102 is made such that it extends to the left side being a possible direction to include the near portion. Contrarily, in a case where the lens for left eye is designated, the measurement starting position in FIGS. 4A to 4C is made at the lower left end of the mark 102. Incidentally, the analysis region may be set to cover a still wider range. The range can be changed arbitrarily in size by calling up a menu screen by the use of the switch 3.

The calculation and control part 40 controls to obtain the position of the lens LE based on the output signals from the detectors 31 and 32. In addition, based on the output signal from the photo-sensor 15, it controls to obtain the refractive power distribution within the measurement region successively at predetermined time intervals (e.g., every 0.1 second). Then, it controls to associate the position of the lens LE with the refractive power distribution within the measurement region in that position and store them into the memory 41 at all times. Data stored into the memory 41 is displayed on the display 2 via the display circuit 42. Within the mark 120 on the display 2, the display circuit 42 displays the obtained refractive power distribution in the form of a color map in which color-coding is made by power. Incidentally, as for the refractive power distribution, both the spherical power distribution and the cylindrical distribution can be displayed in the form of the map, and selection which is to be displayed can be previously performed by the use of the switch 3. In FIGS. 5A to 5D described below, the map of the cylindrical power distribution is displayed.

When the lens LE is moved so as to measure the refractive power distribution in another position within the analysis region, a display position of the mark 120 is moved in real time based on the position of the lens LE detected by the detectors 31 and 32. The calculation and control part 40 controls to obtain a new position of the lens LE and refractive power distribution within the measurement region in that position and store them into the memory 41. Then, the map of the refractive power distribution is displayed within the mark 120.

Incidentally, while the lens LE is moved, if the measurement is performed again in a position where the measurement has been once performed, the calculation and control part 40 controls to overwrite the data stored in the memory 41 with new data (the data may be averaged or any of the data may have priority based on predetermined conditions).

Figure 5B:
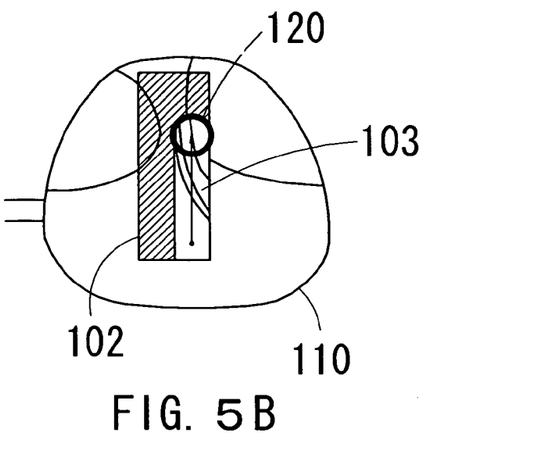

Consequently, in accordance with the movement of the lens LE, the map of the refractive power distribution for an already-measured area is enlarged successively and displayed. FIG. 5B shows a display example at the time when the lens LE is moved so that the mark 120 is moved upward from the measurement starting position within the mark 102. In the already-measured area, a map 103 of the refractive power distribution is displayed, and a yet-to-be measured area remains masked. Owing to such a display, the already-measured area and the yet-to-be measured area can be easily discriminated to easily know in which direction the lens LE should be moved.

Figure 5C:
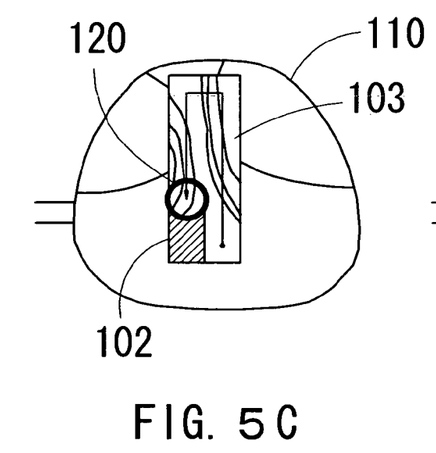
Figure 5D:
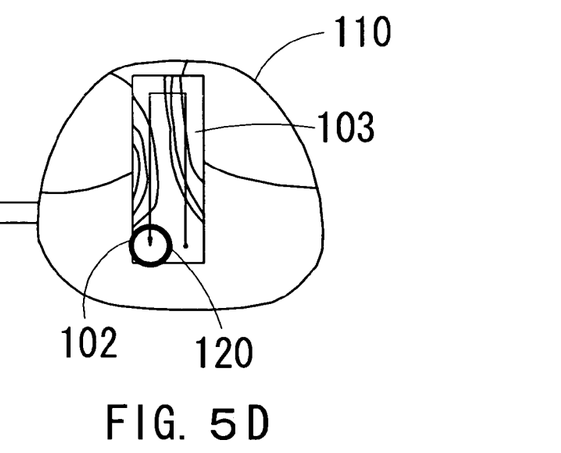

FIG. 5C shows a display example at the time when the lens LE is moved so that the mark 120 is further moved upward in the mark 102 to reach the upper right end and then moved in the left direction, and then further moved downward. When moving the lens LE in the right direction so that the mark 120 is moved in the left direction, the movement can be made with reference to the scale 7 provided to the frame table 6. FIG. 5D shows a display example at the time when the lens LE is moved so that the mark 120 is further moved downward in the mark 102 to reach the lower left end.

As shown in FIGS. 5A to 5D, by moving the lens LE so that the mark 120 is moved to clear the yet-to-be measured area, the map 103 is displayed in the already-measured area. At this time, in a case where only a certain area within the mark 102 is masked, there remains a yet-to-be measured area. It is essential only that the lens LE is moved so as to move the mark 120 to the area to perform measurement thereon. Besides, in a case where a vertical length of the lens LE is short, even if the mask 120 is moved to the lower end of the lens LE, the already-measured area is not enlarged to reach the upper end of the mark 102; however, it does not matter even if a yet-to-be measured area remains. In addition, when moving the lens LE in a two-dimensional direction orthogonal to the optical axis L1, a rear surface of the lens LE is preferably positioned so as to contact with the top of the nosepiece 4. Thereby, the refractive power distribution can be measured while bringing the height to the rear surface of the lens LE within the measurement region to be almost constant.

After the measurement within the mark 102 is completed and the button 8 is pressed again, the calculation and control part 40 controls to organize the refractive power distribution within the respective measurement regions stored in the memory 41 to reconstruct them, and display afresh the map of the refractive power distribution within the analysis region. Consequently, a highly reliable map can be displayed.

Figure 6:
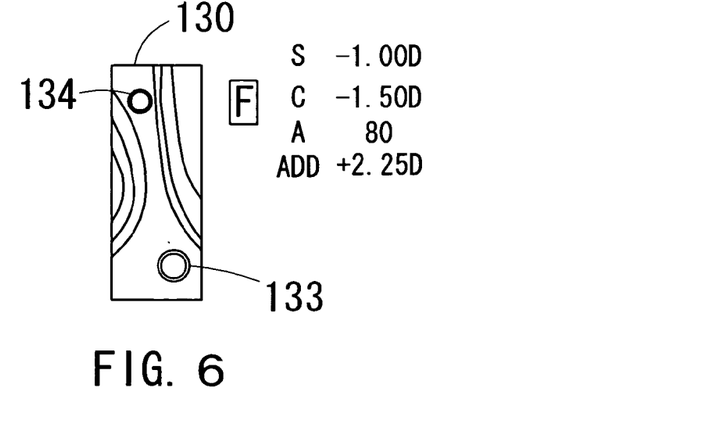
FIG. 6 shows a display example of a map of refractive power distribution.

After the completion of the measurement, the calculation and control part 40 controls to specify the positions of the distance portion and the near portion based on the data stored in the memory 41 and display them with the map of the refractive power distribution. The position of the near portion in the up/down direction can be set in a peak position where at least three measurement positions in the up/down direction have almost the same spherical equivalent powers (a predetermined allowable range exists). The position of the near portion in the right/left direction can be set in a position where an optical distortion being an absolute value of a difference between the cylindrical powers of the distance portion and the near position is minimum. Further, the calculation and control part 40 controls to display the spherical power (S), the cylindrical power (C), the cylindrical axial angle (A), and the addition power (ADD) of the distance portion in the vicinity of the map 130. FIG. 6 shows an example of a display screen at the time when the button 8 is pressed again, where the distance portion in the map 130 is indicated by a white circle 133 and the near portion is indicated by a black circle 134. Incidentally, in displaying the map, by the use of the switch 3, the map of the cylindrical power distribution and the map of the spherical power distribution can be switched, or both of them can be displayed side by side on a single screen.

Figure 7:
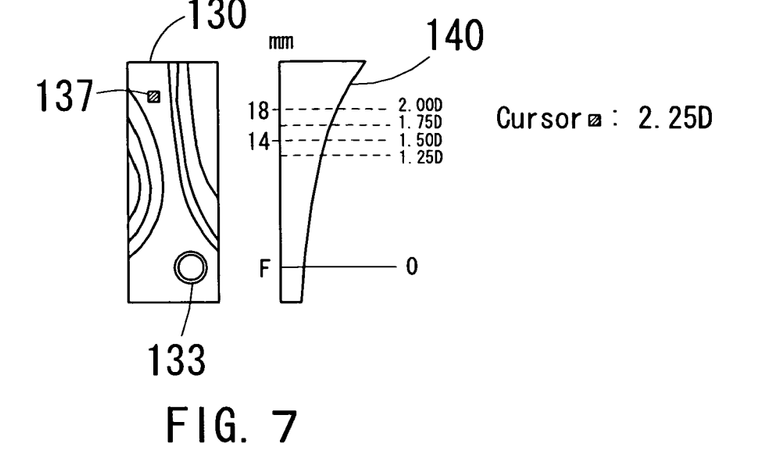
FIG. 7 shows a display example of a graph of addition power.

Incidentally, in the progressive power lens where there is no peak position of the addition powers, the near portion cannot be specified. In such a case, as shown in FIG. 7, a graph 140 showing a state of change in the addition power is displayed along with the map 130, and the addition powers at predetermined distances (e.g., 12 mm, 14 mm, 16 mm, 18 mm, and soon) from the distance portion are displayed. Further, by displaying a cursor 137 on the map 130 and moving the cursor 137 to an arbitrary position by the use of the switch 3, the addition power in the position can be displayed. Furthermore, in the map of the spherical power distribution or the map of the cylindrical power distribution, by designating two arbitrary positions (points) as a distance point and a near point by the use of the cursor 137 and the like, a difference between the spherical powers in the two positions can be displayed as the addition power. Thereby, the addition power can be easily known also in a variety of progressive power lenses.

In addition, when a printout of the measurement results is instructed by the use of the switch 3, the map 130 as shown in FIG. 6 and the graph 140 as shown in FIG. 7 are printed out.

The aforementioned embodiment can be variously modified. For example, though the map 103 of the refractive power distribution is displayed in the already-measured area as an instruction to guide the movement of the lens LE in the above description, it is also preferable that a display pattern such as color of the already-measured area is discriminated from that of the yet-to-be measured area.

Figure 8:
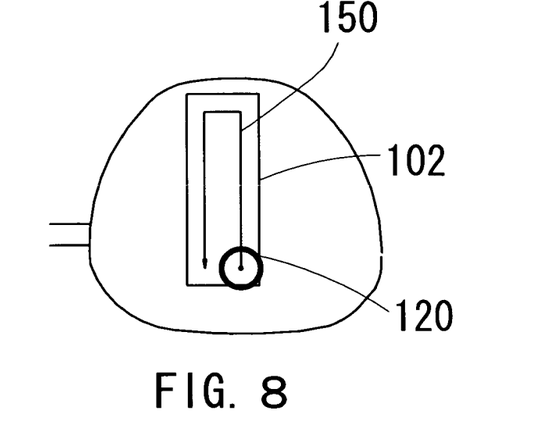
FIG. 8 shows a display example for guiding the movement of the subject lens (shift of the measurement region)

Further, as shown in FIG. 8, it is preferable that an arrow guide mark 150 is displayed with respect to the position which is judged to be the distance portion, and the lens LE is moved following the mark 150. When the lens LE is moved, the mark 120 is moved along the mark 150. Since the position of the mark 120 is moved in real time in accordance with the position of the lens LE detected by the detectors 31 and 32, it is essential only that the lens LE is moved so that the center of the mark 120 does not deviate from the mark 150. Incidentally, in the case of the lens LE for right eye, based on its selection signal, the mark 102 and the mark 150 are displayed while displaced to the nose side relative to the distance portion.

In addition, though the mark 120 is moved relative to the mark 110 and the mark 102 in accordance with the movement of the lens LE in the display examples shown in FIGS. 5A to 5D and FIG. 8, the movement may be contrarily made. In other words, it is also preferable that the position of the mark 120 remains unchanged while the mark 110 and the mark 102 are moved in accordance with the movement of the lens LE.

Additionally, the measurement starting position in the analysis region may be set in an approximate progressive portion or an approximate near portion instead of the approximate distance portion. Whether at least one of the measurement positions is in the approximate progressive portion or in the approximate near portion can be determined from the refractive power distribution within the measurement region corresponding to the aperture 4a as in the case of the distance portion. It is essential only to display the mark 100 in the measurement starting position to guide the movement of the lens LE.

Figure 9:
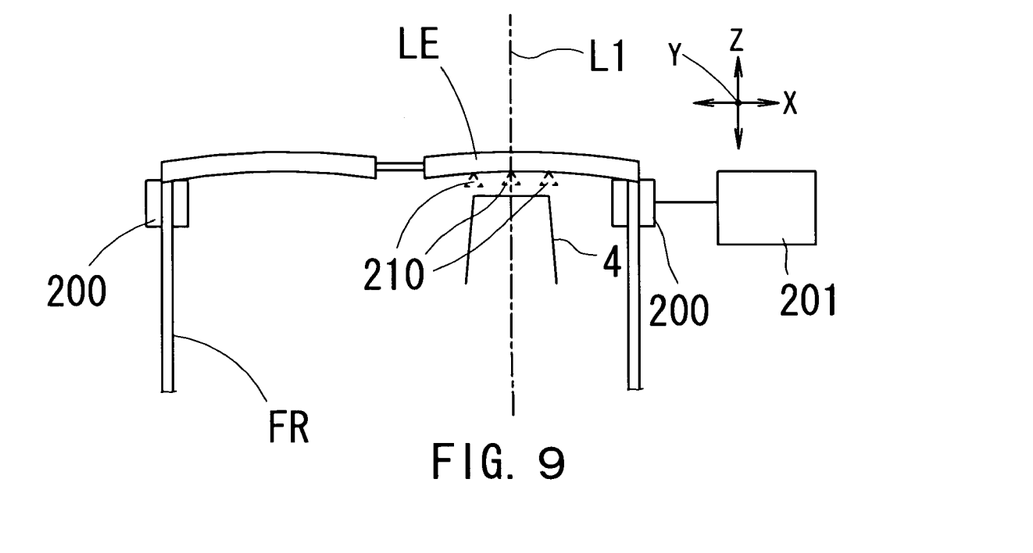
FIG. 9 is a view illustrating an example where frames (an eyeglass frame) are hold and moved.

Besides, though a constitution is employed where the frames (lens LE) are moved by manual operation in the above embodiment, another constitution may be employed where the frames (lens LE) are hold and moved. FIG. 9 is a view showing a schematic configuration thereof. A holding mechanism 200 horizontally holds frames FR in which the lenses LE are fit, at both the right and left ends. In addition, the holding mechanism 200 is moved by a movement mechanism 201 for moving the held frames FR in the optical axis L1 direction (the height direction, a Z-direction), the right/left direction (an X-direction), and the back/forth direction (a Y-direction). The movement mechanism 201 includes a motor mechanism, a slide mechanism and the like for each of the X-, Y- and Z-directions, and is driven and controlled by the calculation and control part 40. Position sensors 210 such as a touch sensor arranged in corresponding positions to the top of the nosepiece 4 detect the height to the rear surface of the lens LE. When moving the frames FR (lenses LE), the calculation and control part 40 drives and controls the movement mechanism 201 based on output signals from the position sensors 210 so that measurement is performed while bringing the rear surface of the lens LE to a predetermined height. Further, the movement mechanism 201 is driven and controlled based on the designation signal for right/left eyes, the output signal from the photo-sensor 15, and the output signals from the detectors 31 and 32, so that the lens LE is moved in the X- and Y-directions to obtain the refractive power distribution within the analysis region.

As mentioned above, according to the present invention, the refractive power distribution within the analysis region including the distance portion, the progressive portion, and the near portion can be easily measured, and the map of the measured refractive power distribution can be displayed.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring optical characteristics of a subject lens to be measured, the lens meter comprising:
   a lens rest having an aperture of predetermined diameter, which supports the subject lens;
   a measurement optical system including a measurement optical axis passing through the aperture, a light source projecting a measurement light bundle along the measurement optical axis, a target plate having a plurality of measurement targets, and a two-dimensional image sensor detecting images of the targets, the target images being formed by the measurement light bundle having passed through the subject lens, the aperture, and the target plate;
   a calculation part which obtains refractive power distribution within a measurement region of the subject lens based on a detection result obtained by the image sensor, the measurement light bundle having passed through the measurement region being capable of passing through the aperture;
   a detection part which detects a position of the subject lens in a two-dimensional direction orthogonal to the measurement optical axis;
   guiding means for guiding movement of the subject lens on the lens rest so as to shift the measurement region so that refractive power distribution within an analysis region of the subject lens including a distance portion, a progressive portion, and a near portion is obtained;
   a storage part which stores the refractive power distribution within the measurement region obtained in accordance with the shift of the measurement region by the movement of the subject lens while associating with the position detected at the time of the obtainment;
   a display part; and
   a display control part which controls to display a map of the refractive power distribution within the analysis region on the display part based on the stored refractive power distribution within the measurement region and the stored position.

2. The lens meter according to claim 1, wherein the guiding means firstly guides the movement of the subject lens so that a region of the subject lens including one of the distance portion, the progressive portion, and the near portion becomes the measurement region based on the detection result obtained by the image sensor, and subsequently guides the movement of the subject lens for shifting the measurement region so that the refractive power distribution within the analysis region is obtained based on a detection result obtained by the detection part.

3. The lens meter according to claim 2, further comprising designation means for making designation as to whether the subject lens is for right eye or for left eye, wherein
   the guiding means guides the movement of the subject lens in a direction or to a position which is different according to the designation of right and left eyes.

4. The lens meter according to claim 1, wherein the guiding means includes the display part and the display control part, and displays the analysis region and the current measurement region under measurement, and displays a state that an already-measured area within the analysis region is enlarged successively in accordance with the shift of the measurement region by the movement of the subject lens.

5. The lens meter according to claim 1, further comprising a movement unit which holds frames in which the subject lenses are fit and relatively moves the frames with respect to the measurement optical axis so as to move the subject lens in the two-dimensional direction orthogonal to the measurement optical axis, wherein
   the guiding means includes the movement unit and a movement control part which controls to drive the movement unit based on the detection result obtained by the image sensor and a detection result obtained by the detection part.

* * * * *